C. C. ROBERTS.

Gages for Sewing-Machines.

No. 5,689. Reissued Dec 16, 1873.

Witnesses.
H. F. Connell.
S. Williams

Inventor.
C. C. Roberts.
Per. Burridge & Co.
Attys.

AM. PHOTO-LITHOGRAPHIC CO. N.Y. (OSBORNE'S PROCESS)

UNITED STATES PATENT OFFICE.

CHARLES C. ROBERTS, OF PERRYSBURG, OHIO.

IMPROVEMENT IN GAGES FOR SEWING-MACHINES.

Specification forming part of Letters Patent No. 124,086, dated February 27, 1872; reissue No. 5,689, dated December 16, 1873; application filed June 25, 1873.

*To all whom it may concern:*

Be it known that I, CHARLES C. ROBERTS, of Perrysburg, in the county of Wood and State of Ohio, have invented a certain new and Improved Gage for Sewing-Machines; and I do hereby declare that the following is a full, clear, and complete description thereof, reference being had to the accompanying drawing making part of the same.

Figure 1:
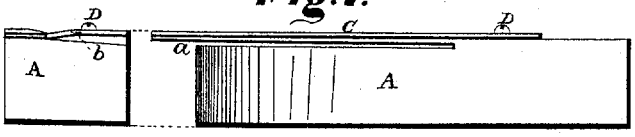
Figure 2:
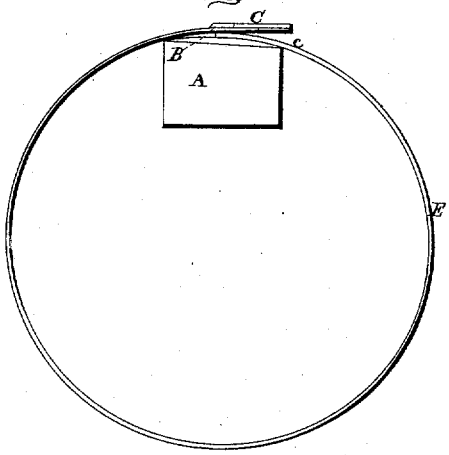
Figure 3:
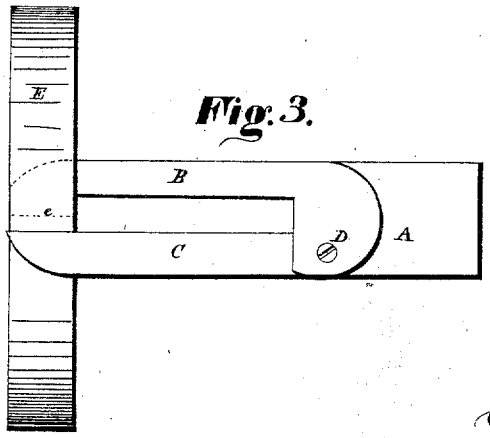

Figure 1 is a side view of the gage. Fig. 2 is an end view holding a section of a box. Fig. 3 is a top view holding a section of a box.

Like letters of reference refer to like parts in the several views.

The nature of this invention relates to a gage, the specific purpose of which is to govern the lap of the material whereof fruit-boxes are made, so that said lap shall be of a uniform length, and the boxes, in consequence, be of a uniform size. The material is held by the gage while the two lapped ends are being sewn together to form the body and the cover of the box.

The following is a description of the construction of the gage, and the practical operation of the same.

In the drawing, Fig. 1, A represents an arm or bed-plate, so arranged in its relation to a sewing-machine that the needle thereof works at or near the point *a* of the arm, between the fingers B C, Fig. 2. Said fingers are made of metal or plates, and are secured to the upper side of the arm by a screw, D, which allows the gage to be moved laterally to get at the shuttle, &c. The finger B lies flat upon the arm, whereas the finger C is raised above it by cutting away a section of the arm immediately under the finger, thereby forming a space between the under side of the finger and the upper side of the arm. The inner edge of the finger C is grooved or cut to form a shoulder, *b*, Fig. 1, whereas the inner edge of the other finger is left square.

As aforesaid, the object of this invention is to gage the laps of the pieces of which the sides of fruit-boxes are made. Said boxes are made of thin sheets of wood, and usually of a circular form. The sheets are prepared by cutting them of the proper width and length for the body of the box, and for the rim of the cover. Such pieces all being cut of an exact and equal length, it becomes necessary, in order that the diameter of the boxes shall be exactly alike, that the lap of the two ends of each piece should also be exactly of the same length.

For the purpose of producing this uniformity in the lap of the pieces for the body of the boxes and the rim of the cover is the object of this gage, and which is used for that purpose as follows: A piece of board, of the proper width and length for a box, is represented by E, one end, *c*, of which is inserted under the finger C, and pressed against the edge of finger B, as shown in Fig. 2. The opposite end is then brought round over finger B, and inserted under finger C against the shoulder *b* of the rabbet. The distance from said shoulder to the edge of finger B determines the length of the lap, which, as is obvious, will always give the same lap to each piece. By means of the abutting shoulder or faces of the fingers, the material of which the boxes are made is gaged from the ends, whereby a given size of box may be made uniform. The lap is secured by sewing the ends together, which, when held in the gage, brings it in proper relation to the needle for that purpose, and the work is pushed back along the fingers as it is stitched.

This gage enables any number of laps to be made exactly of the same length, and hence the boxes and covers will be uniform in their diameter, so that no trouble is had in fitting the covers to the boxes.

What I claim as my invention, and desire to secure by Letters Patent, is—

1. The gage herein described, consisting of the shouldered finger B and the finger C, adapted to be secured to an arm, A, as and for the purpose set forth.

2. In sewing-machine gages for sewing boxes, two fingers, B C, or plates so arranged in relation to each other that the material whereof the boxes are made is lapped and gaged between said fingers for sewing, substantially as and for the purpose set forth.

CHARLES C. ROBERTS.

Witnesses:
J. H. BURRIDGE,
S. WILLIAMS.